US009126757B2

(12) United States Patent
Dunham (10) Patent No.: US 9,126,757 B2
(45) Date of Patent: Sep. 8, 2015

(54) LIFTING DEVICE FOR ROLLED OBJECTS (71) Applicant: Howard Dunham, Clear Lake, MN (US)

(72) Inventor: Howard Dunham, Clear Lake, MN (US)

( * ) Notice: Subject to any disclaimer, the term of this patent is extended or adjusted under 35 U.S.C. 154(b) by 0 days.

(21) Appl. No.: 14/184,182

(22) Filed: Feb. 19, 2014

(65) Prior Publication Data

US 2014/0265386 A1    Sep. 18, 2014

Related U.S. Application Data (60) Provisional application No. 61/769,189, filed on Feb. 25, 2013, provisional application No. 61/804,879, filed on Mar. 25, 2013, provisional application No. 61/829,016, filed on May 30, 2013.

(51) Int. Cl.
*B65G 7/12* (2006.01)
(52) U.S. Cl.
CPC ........................................ *B65G 7/12* (2013.01)
(58) Field of Classification Search
CPC ............................................................ B65G 7/12
USPC ............. 294/15, 26, 82.11, 93; 414/910, 911; 224/157
See application file for complete search history.

(56) References Cited

U.S. PATENT DOCUMENTS

| 559,669 | A | * | 5/1896 | Broderick | 294/15 |
| 608,479 | A | * | 8/1898 | Rhodes | 294/15 |
| 1,096,378 | A | * | 5/1914 | Lawrence | 105/129 |
| 1,477,073 | A | * | 12/1923 | Paine | 294/104 |
| 1,482,056 | A | * | 1/1924 | Watkins | 294/26 |
| 1,721,745 | A | * | 7/1929 | Otto | 294/15 |
| 2,832,628 | A | * | 4/1958 | Turnbull | 294/17 |
| 2,846,259 | A | * | 8/1958 | Sadler | 294/15 |
| 4,392,679 | A | * | 7/1983 | Barnes et al. | 294/15 |
| 4,991,893 | A | * | 2/1991 | Gordon et al. | 294/17 |
| 5,382,064 | A | * | 1/1995 | Blais | 294/26 |
| 5,848,816 | A | * | 12/1998 | Hancock | 294/15 |
| 7,029,045 | B2 | * | 4/2006 | Tumminaro | 294/15 |
| 7,588,274 | B2 | * | 9/2009 | Worthington | 294/62 |
| 7,862,093 | B2 | * | 1/2011 | Stiltner | 294/15 |
| 8,157,304 | B2 | * | 4/2012 | Fredriksson | 294/82.11 |
| 2010/0314892 | A1 | * | 12/2010 | Evans | 294/15 |
| 2011/0241366 | A1 | * | 10/2011 | Hamblin et al. | 294/158 |

OTHER PUBLICATIONS

"Buddy Bar." Panther Products Corporation, Published on or about Oct. 2004. Web. <www.pantherproducts.us/onDeck/BudBar.htm>.

* cited by examiner

*Primary Examiner* — Saul Rodriguez
*Assistant Examiner* — Gabriela Puig
(74) *Attorney, Agent, or Firm* — Hamre, Schumann, Mueller & Larson, P.C.

(57) ABSTRACT

A device and a lifting system for manually lifting and transporting an object are described. The device includes a handle member including a linking member connector disposed at about a center point of a length of the handle member. A first end of a linking member is securely connected to the handle member by the linking member connector. The linking member has a length suitable for a person to raise the object to be lifted and transported between his knees and his waist. A lifting member has at least a portion insertable into a hollow core of the object to be lifted and transported, a first end of the lifting member connected to a second end of the linking member and a second end of the lifting member including a contact member providing a lifting surface for contacting the object to be lifted and transported.

20 Claims, 5 Drawing Sheets

LIFTING DEVICE FOR ROLLED OBJECTS

REFERENCE TO RELATED APPLICATIONS

The present application claims the benefit of U.S. Provisional Patent Application Ser. Nos. 61/769,189 entitled "MEMBRANE ROOFING MANUAL ROLL CARRIER," filed on Feb. 25, 2013; 61/804,879 entitled "MEMBRANE ROOFING MANUAL ROLL CARRIER" filed on Mar. 25, 2013 and 61/829,016 entitled "MEMBRANE ROOFING MANUAL ROLL CARRIER," filed on May 30, 2013, which are herewith incorporated by reference in their entirety.

FIELD

This disclosure relates generally to a device for lifting and transporting an object. More specifically, the disclosure relates to a device for lifting and transporting an object having a hollow core, such as, but not limited to, a rolled material.

BACKGROUND

Heavy objects often require transport in locations not easily accessible by, for example, a forklift or other mechanized lifting apparatus. For example, in the commercial roofing industry, a single ply roofing system generally involves a roofing membrane material (e.g. rubber, thermoplastic olefin, polyvinyl chloride, or the like) being applied over insulation. The membrane is generally stored in a rolled form. Rolls of the membrane roofing material can weigh between about 250 pounds and about 1,200 pounds. The membrane roofing material may be hoisted onto the roof of the building using a crane. Once the membrane roofing material is on the roof, however, it may need to be transported to a location where it is to be applied, without use of a crane.

SUMMARY

This disclosure relates generally to a device for manually lifting, and transporting an object. More specifically, the disclosure relates to a device for manually lifting and transporting an object having a hollow core, such as, but not limited to, a rolled material.

A device for manually lifting and transporting an object is described. The device includes a handle member for a person to grasp, the handle member including a linking member connector disposed at about a center point of a length of the handle member. A linking member has first and second ends, the first end is securely connected to the handle member by the linking member connector and the linking member has a length suitable for a person to raise the object to be lifted and transported between his knees and his waist. A lifting member has at least a portion insertable into a hollow core of the object to be lifted and transported, a first end of the lifting member connected to the second end of the linking member and a second end of the lifting member including a contact member providing a lifting surface for contacting the object to be lifted and transported.

A lifting system for manually lifting and transporting an object is described. The lifting system includes a first lifting device. The first lifting device includes a handle member for a person to grasp, the handle member including a linking member connector disposed at about a center point of a length of the handle member. A linking member has first and second ends, the first end is securely connected to the handle member by the linking member connector and the linking member has a length suitable for a person to raise the object to be lifted and transported between his knees and his waist. A lifting member has at least a portion insertable into a hollow core of the object to be lifted and transported, a first end of the lifting member connected to the second end of the linking member and a second end of the lifting member including a contact member providing a lifting surface for contacting the object to be lifted and transported. A second lifting device includes a handle member for a person to grasp, the handle member including a linking member connector disposed at about a center point of a length of the handle member. A linking member has first and second ends, the first end is securely connected to the handle member by the linking member connector and the linking member has a length suitable for a person to raise the object to be lifted and transported between his knees and his waist. A lifting member has at least a portion insertable into a hollow core of the object to be lifted and transported, a first end of the lifting member connected to the second end of the linking member and a second end of the lifting member including a contact member providing a lifting surface for contacting the object to be lifted and transported. The first lifting device is to be disposed on a first end of the object to be lifted and transported and the second lifting device is to be disposed on a second end opposite the first end of the object to be lifted and transported.

BRIEF DESCRIPTION OF THE DRAWINGS

References are made to the accompanying drawings that form a part of this disclosure and which illustrate the embodiments in which the systems and methods described in this specification can be practiced.

Like reference numbers represent like parts throughout.

DETAILED DESCRIPTION

This disclosure relates generally to a device for manually lifting and transporting an object. More specifically, the disclosure relates to a device for manually lifting and transporting an object having a hollow core, such as, but not limited to, a rolled material.

A lifting device configured for lifting and transporting an object having a hollow core is disclosed. More particularly, a lifting device configured for lifting and transporting a rolled material such as, but not limited to, a roll of membrane roofing material, a roll of landscaping fabric, or the like, is disclosed. A first lifting device can be used to lift a first end of a rolled material and a second lifting device that is the same as or similar to the first lifting device can be used to lift a second end of the rolled material, allowing at least two people to lift and transport the rolled material to a desired location. In some embodiments, more than two people can be used to lift and transport the rolled material, using each of the first and second lifting devices.

Lifting and transporting a rolled material is described by way of example in this specification. Examples of rolled materials include, but are not limited to, rolls of membrane roofing material, rolls of landscaping fabric, rolls of linoleum flooring, rolls of carpet, or the like. In some embodiments, the rolled material can be wound without a core inserted, while in other embodiments the rolled material can be wound about a core, such as, but not limited to, a cardboard cylinder. However, the embodiments, aspects, and concepts described may apply to devices configured for lifting other types of objects. Examples of other types of objects include, but are not limited to, objects with hollow cores, such as a pipe. In some embodiments, objects with hollow cores can be a shape other than cylindrical, such as, but not limited to, a rectangular prism, or the like.

Figure 1A:
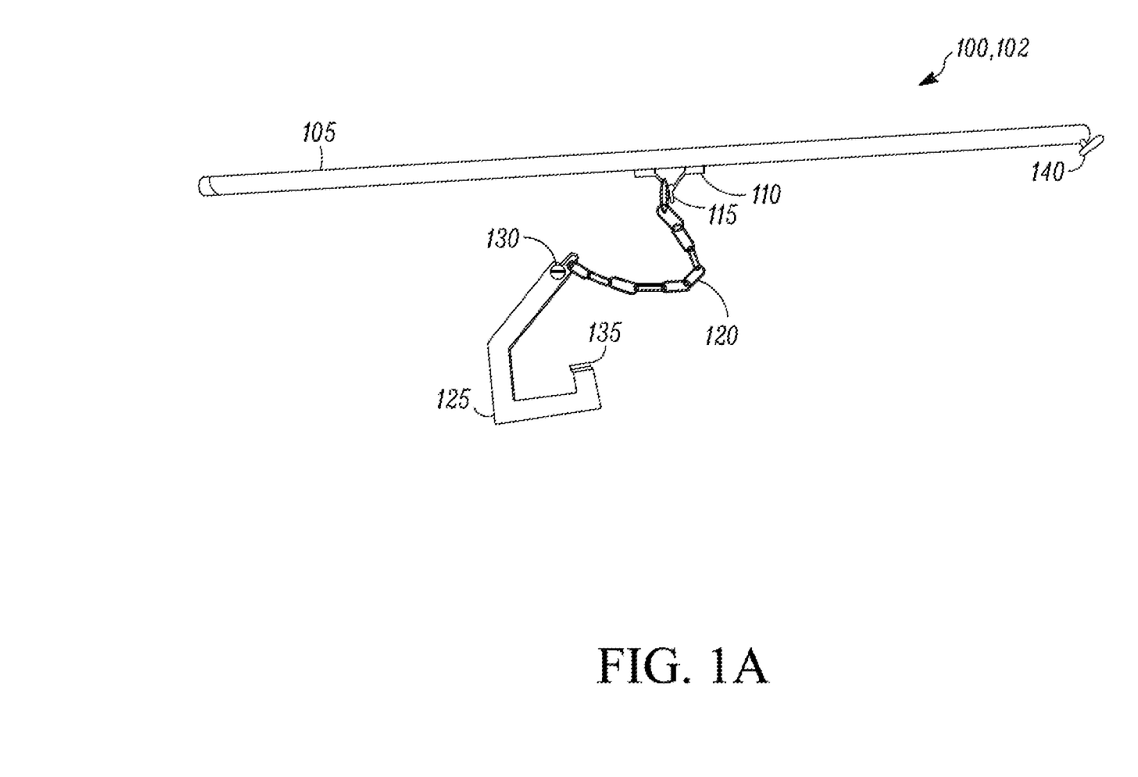
FIG. 1A illustrates a lifting device for manually lifting and transporting an object, according to some embodiments.
Figure 1B:
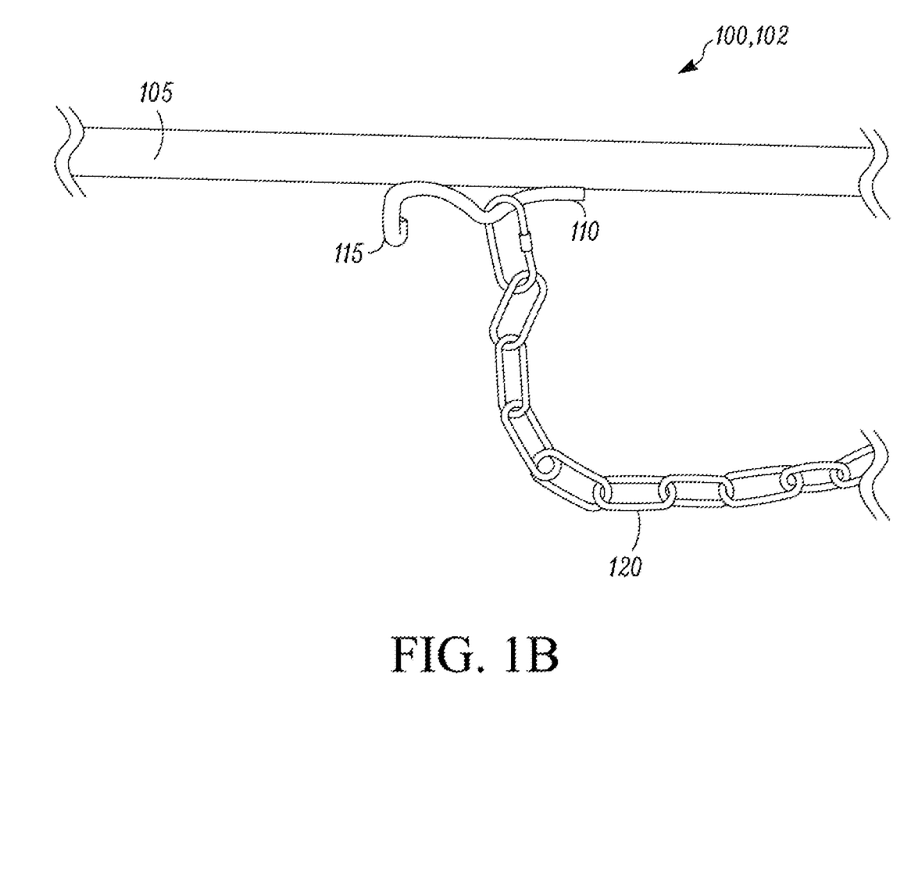
FIG. 1B illustrates a view of a portion of a lifting device for manually lifting and transporting an object, according to other embodiments.
Figure 1C:
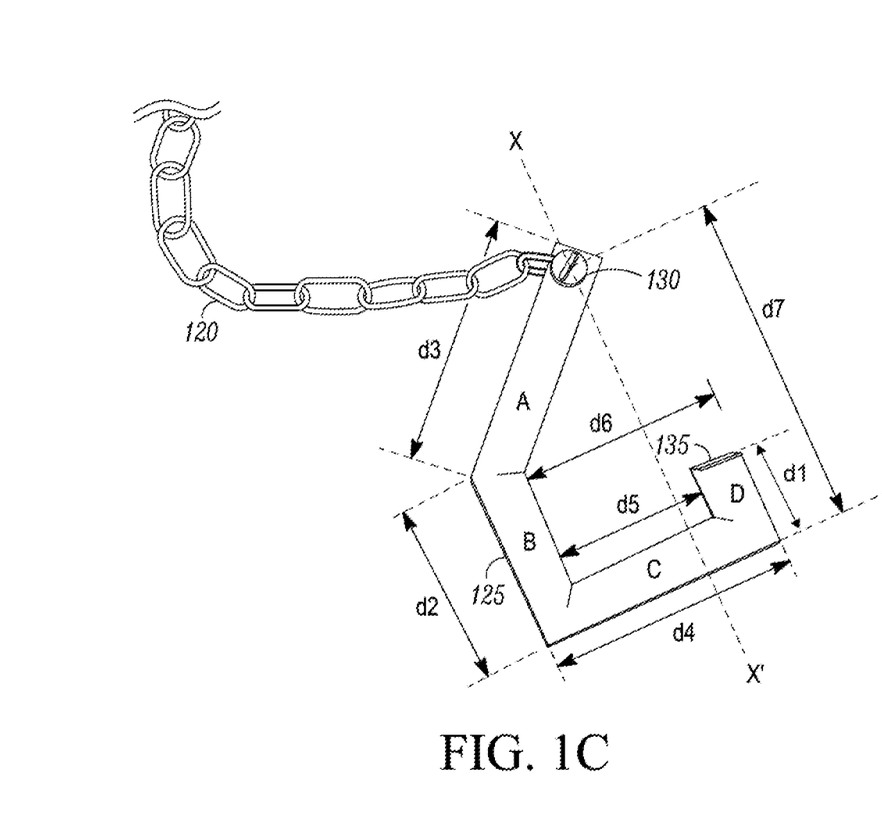
FIG. 1C illustrates a view of a portion of the lifting device for manually lifting and transporting an object of FIG. 1A, according to some embodiments.

FIGS. 1A-1C illustrate a lifting device 100, 102 for lifting and transporting an object, according to some embodiments. The lifting device 100 can be used to lift at a first location of the object. The lifting device 102 can be used in conjunction with the lifting device 100 to lift at a second location of the object. To simplify this specification, the lifting device 100, 102 will be referred to as the lifting device 100 throughout. Generally, the first location is a first end of a rolled material having a hollow core and the second location is a second end of the rolled material. When used together, the lifting devices can be used to lift and transport an object. The lifting device 100 can also be used to lift and transport an object other than an object including a hollow core, particularly objects that are heavy or awkward to lift and transport.

The lifting device 100 generally includes a handle member 105 and a lifting member 125 interconnected by a linking member 120. In some embodiments, the linking member 120 can be disconnected from the handle member 105 in order to replace the linking member 120, modify the linking member 120, or modify the lifting member 125. In some embodiments, the lifting member 125 can be disconnected from the linking member 120 and replaced with another lifting member.

A person can grasp the handle member 105 in order to lift an object. The handle member 105 can also be used to transport the lifting device 100 when not lifting an object. In some embodiments, the handle member 105 can alternatively be referred to as the gripping member 105, the lifting bar 105, or the like.

The handle member 105 is designed such that a person can grasp the handle member 105 and continue to grasp the handle member 105 while lifting and transporting an object. The handle member 105 can be designed in a variety of geometrical shapes and sizes. For example, the handle member 105 can be a pipe, such as, but not limited to, a schedule-40 pipe having a nominal pipe size of about 0.75 inches, a schedule-80 pipe having a nominal pipe size of about 1 inch, or the like. Other geometrical shapes may be used for the handle member 100, such as, but not limited to, a rectangular prism.

The length of the handle member 105 can be varied. The lifting device 100 is generally configured such that two people use the lifting device 100 (e.g., one person disposed on each side of a linking member connector 110 in a direction of a longitudinal axis of the handle member 105). Accordingly, the handle member 105 is of a length sufficient to permit two people to stand shoulder to shoulder in order to lift an object. In some embodiments, the handle member 105 can be between about 30 inches and about 50 inches in length. In some embodiments, the handle member 105 can be between about 35 inches and about 45 inches in length. In some embodiments, the handle member 105 can have a length of about 42 inches.

The handle member 105 can be manufactured from any of a variety of materials such as, but not limited to steel, aluminum, or the like. The material of the handle member 105 is selected such that the handle member 105 does not permanently deform or break when lifting an object. Further, the material of the handle member 105 is selected so as to provide sufficient strength while minimizing a weight of the overall lifting device 100.

The handle member 105 includes an individual support member 140 disposed at about a first end of the handle member 105. In some embodiments, the individual support member 140 can be included at about a first end of the handle member 105 and about a second end of the handle member 105. The individual support member 140 can be used as a contact surface in order to reduce a number of people using the lifting device 100. In such an embodiment, the handle member 105 can be turned substantially parallel to the object to be lifted, with an end having the individual support member 140 disposed above the object. Accordingly, a person can lift from the opposite end of the handle member 105, such that when lifting, a portion of a surface of the individual support member 140 is in contact with a surface of the object being lifted. The portion of the surface of the individual support member 140 can spread the force applied to the object when lifting, thereby reducing the pressure on the object. In some embodiments, the individual support member 140 can provide a contact surface with a greater contact area than the handle member 105 to prevent the handle member 105 from slipping from the object while it is being lifted and/or transported.

The linking member connector 110 is a connector by which the handle member 105 and the linking member 120 are interconnected. In some embodiments, the linking member connector 110 can alternatively be referred to as the chain anchor 110, the chain connector 110, or the like. In some embodiments the linking member connector 110 can be securely affixed to the handle member 105 by, for example, welding. The linking member connector 110 is generally disposed at about a middle of the handle member 105 (along its longitudinal axis) such that when an object is lifted, the force applied is at about the middle of the handle member 105. In some embodiments, the linking member connector 110 can be a steel rod having a diameter of about 0.375 inches and a length of about 4 inches that is securely affixed to the handle member 105 in a configuration to which the linking member 120 can be connected.

The linking member connector 110 includes an adjustment member 115. In some embodiments, the adjustment member 115 can be a hook. The adjustment member 115 is disposed at about the middle of the handle member 105 in some embodiments. In the embodiment illustrated in FIG. 1A, the adjustment member 115 is a hook disposed at about a middle of the linking member connector 110. In the embodiment illustrated in FIG. 1B, the adjustment member 115 is a hook disposed at an end of the linking member connector 110. In other embodiments, the location of the adjustment member 115 can be varied along the length of the linking member connector 110. The adjustment member 115 is designed such that a person can vary the clearance between a bottom surface of an object being lifted and a lifting surface from which the object is lifted (e.g., ground, roof surface, or the like). Decreasing a length of the linking member 120 will increase the clearance between the object and the lifting surface. Generally, the length of the linking member 120 is selected in order that a person using the lifting device 100 can lift between his knees and his waist. In some embodiments, the length of the linking member 120 is between about 14 inches and about 30 inches. In some embodiments, the length of the linking member 120 is about 18 inches.

The linking member 120 is connected to the lifting member 125 by a lifting member connector 130. In some embodiments, the lifting member connector 130 can be, for example, a bolt anchor shackle. The lifting member connector 130 can be removable such that the lifting member can be disconnected from the linking member 120. In some embodiments, this can allow for the lifting member 125 to be replaceable (e.g., to repair the lifting member, to connect a lifting member having a different configuration, or the like).

The lifting member 125 can have a variety of configurations. The lifting member 125 is generally designed so that at least a portion can be inserted into a hollow core of an object to be lifted. For example, the lifting member 125 illustrated in FIGS. 1A and 1C is shaped such that at least a portion including the contact member 135 can be inserted into a hollow core of an object to be lifted. The lifting member 125 can be a single piece of material, according to some embodiments. In other embodiments, the lifting member 125 can be a plurality of pieces of material securely connected to each other. For example, the lifting member 125 can be individual pieces of steel, aluminum, or the like that are securely connected to form the lifting member 125. In such embodiments, the pieces of material can be securely connected by welding, bolting, or the like.

As illustrated, the lifting member 125 has a hook shape, with the lifting member connector 130 representing an eye of the hook and a contact member 135 disposed at a point of the hook. The lifting member 125 has a length of d7 from the lifting member connector 130 to the portion C. A plane X-X' parallel with the lifting member 125 is generally about parallel to a longitudinal axis of an object when lifting the object. The lifting member 125 includes four portions A-D. Portion A has a length d3 and extends at an angle offset from the line X-X'. Portion B has a length d2 that is greater than a length d1 of portion D. Portion C has a length d4. A length d5 is maintained between portion B and portion D, as well as the contact member 135. The length d5 can be selected to allow the lifting member 125 to be inserted a distance d6 into a hollow core of an object. A distance d6 extends from the portion B to the portion D. The distance do corresponds to a distance that the lifting member 125 extends into a core of an object to be lifted when the core is in contact with the portion B. As illustrated, the contact member has at least a portion that extends in a direction P from the lifting member connector 130. The portion B is perpendicular to the portion C and the portion C is also perpendicular to the portion D.

The lifting member 125 includes the contact member 135 for providing at least a surface in contact with an object when the object is lifted using the lifting device 100. A plane parallel to the contact member 135 is generally perpendicular to the plane X-X'. In some embodiments, the contact member 135 can be a separate piece of material secured to the lifting member 125. In other embodiments, the contact member 135 and the lifting member 125 can be the same piece of material. The geometry of the contact member 135 can vary according to a particular application (e.g., the type of objects lifted using the lifting device 100). For example, the contact member 135 can be contoured such that the contact member 135 includes a surface that is about the same geometry of a contact surface of an object which is being lifted. According, in some embodiments the contact member 135 can have a curvature that is similar to the curvature of a core in a rounded material.

Figure 1D:
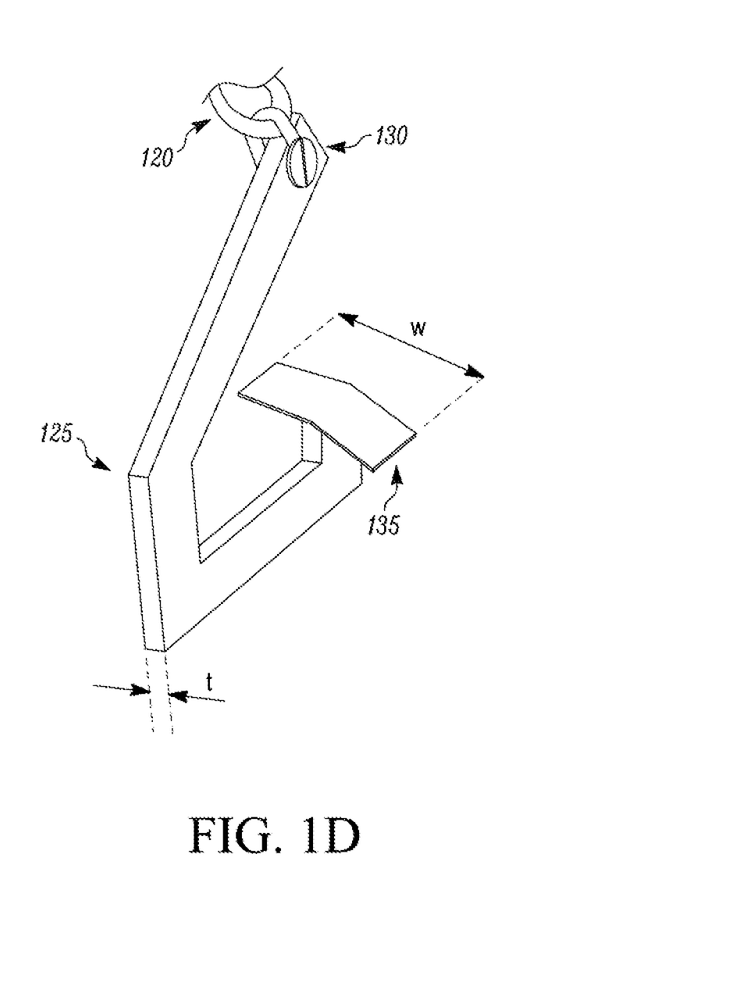
FIG. 1D illustrates a view of the lifting member of the lifting device of FIG. 1A, according to some embodiments.

In other embodiments, the contact member 135 can be substantially planar. In some embodiments, the contact member 135 can be designed such that it keeps the lifting member 125 in place when lifting and transporting an object. As illustrated in FIG. 1D, the contact member 135 has a dimension w that is larger than a thickness t of the portions A-D of the lifting member 125. The contact member 135 extends perpendicular to the plane X-X'. A portion of the contact member 135 extends from both sides of the lifting member 125.

Figure 2:
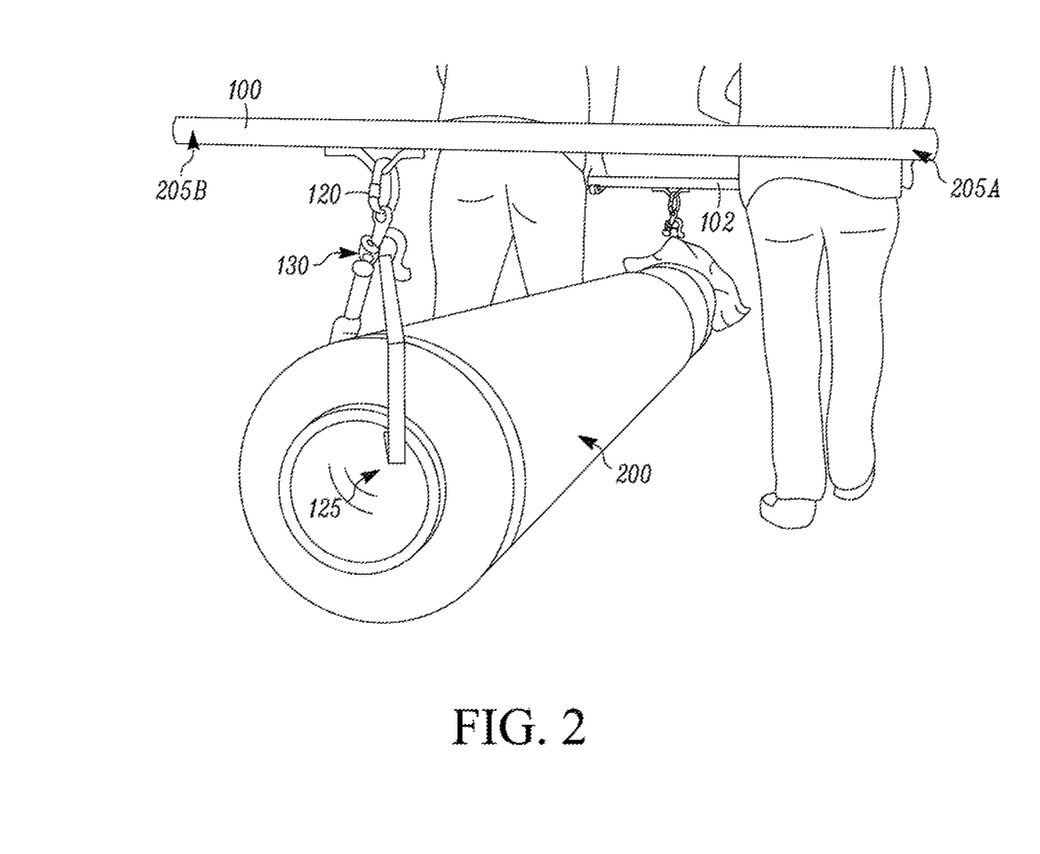
FIG. 2 illustrates an isometric view of the lifting device of FIGS. 1A-1C being used to manually lift a rolled material, according to some embodiments.

FIG. 2 illustrates an isometric view of the lifting device 100 of FIGS. 1A-1C being used to lift a rolled material 200, according to some embodiments. A first end of the rolled material 200 is illustrated in FIG. 2. A second lifting device that is the same as or similar to the lifting device 100 can be disposed at the opposite end of the rolled material 200 in order to lift and be able to transport the rolled material 200.

Generally, when lifting the rolled material 200, a portion of the lifting member 125 including the contact member 135 is inserted into a core of the rolled material 200. The linking member 120 can be used in accordance with the adjustment member 115 to modify a length of the linking member 120 in order to determine an appropriate amount of clearance between a bottom surface of the rolled material 200 and a surface from which the object is being lifted. While grasping the handle member 105, two people can lift the rolled material 200. The number of people can vary, according to various applications. For example, a single person, or more than two people can use the lifting device 100 to lift the rolled material 200. The lifting device 100 is generally designed in order that at a person can carry the handle member 105 at about the person's waist when the rolled material 200 is lifted off a surface.

The person or persons can lift at a first end of the rolled material 200. The people using the lifting device 100 can face the direction they wish to transport the rolled material 200 and grasp the handle member 105 at locations 205A and 205B. Accordingly, the lifting device 100 may allow people to carry the rolled material 200 without having to walk sideways or backwards, which can reduce the difficulty in transporting the rolled material 200. In some embodiments, this can also improve the safety, as the people carrying the rolled material 200 can see obstacles in their paths.

When lifting an object, a longitudinal axis of the handle member 105 is substantially perpendicular to the direction the object is to be transported. A person can stand on each side of the rolled material at locations 205A and 205B, facing about the same direction the person would like to transport the roll of material. When a person is lifting an end of the rolled material 200 without another person, the longitudinal axis of the handle member 105 can be oriented substantially parallel to the object to be transported, with at least a portion of the individual support member 140 in contact with the rolled material 200 (as described in accordance with FIG. 1 above).

The terminology used in this Specification is intended to describe particular embodiments and is not intended to be limiting. The terms "a," "an," and "the" include the plural forms as well, unless clearly indicated otherwise. The terms "comprises" and/or "comprising," when used in this Specification, specify the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts without departing from the scope of the present disclosure. This Specification and the embodiments described are exemplary only, with the true scope and spirit of the disclosure being indicated by the claims that follow.

What is claimed is:

1. A device for manually lifting and transporting an object, comprising:
a handle member for a person to grasp, the handle member including a linking member connector disposed at about a center point of a length of the handle member;
a linking member having first and second ends, wherein the first end is securely connected to the handle member by the linking member connector and the linking member has a length suitable for a person to raise the object to be lifted and transported between his knees and his waist;
a lifting member having at least a portion insertable into a hollow core of the object to be lifted and transported, a first end of the lifting member connected to the second end of the linking member, the lifting member having a thickness; and
a contact member, the contact member secured to a second end of the lifting member and providing a lifting surface for contacting the object to be lifted and transported,
wherein the contact member extends a width perpendicularly across the second end of the lifting member in a direction of the thickness of the lifting member, the width being greater than the thickness at an area of connection between the contact member and the lifting member, and
wherein the contact member is offset a first distance on one side of a line, the line being perpendicular to the portion insertable into the hollow core of the object to be lifted and extending through the first end of the lifting member, a portion of the lifting member extending parallel to the line and being offset a second distance on a second side of the line, wherein the first distance is smaller than the second distance.

2. The device according to claim 1, wherein the handle member is cylindrical.

3. The device according to claim 2, further comprising:
an individual support member disposed at an end of the handle member, wherein a longitudinal axis of the individual support member is perpendicular to a longitudinal axis of the handle member and a length along the longitudinal axis of the individual support member is at least a diameter of the handle member.

4. The device according to claim 1, wherein the handle member is a rectangular prism.

5. The device according to claim 4, further comprising:
an individual support member disposed at an end of the handle member, wherein a longitudinal axis of the individual support member is perpendicular to a longitudinal axis of the handle member and a length along the longitudinal axis of the individual support member is at least a width of the handle member.

6. The device according to claim 1, further comprising:
an adjustment member disposed on one of the linking member connector and the handle member for receiving a portion of the linking member between the first and second ends to modify a distance between the handle member and the linking member.

7. The device according to claim 6, wherein the linking member is a chain and the portion of the linking member is a chain link.

8. The device according to claim 1, wherein the handle member has a length between about 30 inches and about 50 inches.

9. The device according to claim 1, wherein the linking member has a length between about 14 inches and about 30 inches.

10. The device according to claim 1, wherein the first end of the hook-shaped lifting member is disposed vertically above the contact member when the lifting member is inserted into the hollow core of the object to be lifted and transported and the contact member is in contact with the hollow core.

11. A device for manually lifting and transporting an object, comprising:
a handle member, the handle member including a linking member connector disposed at a center point of a length of the handle member;
a linking member having first and second ends, wherein the first end is securely connected to the handle member by the linking member connector;
a lifting member having at least a portion insertable into the object to be lifted and transported, a first end of the lifting member connected to the second end of the linking member; and
a substantially planar contact member secured to a second end of the lifting member, the contact member providing a lifting surface,
wherein the contact member is offset a first distance on one side of a line, the line being perpendicular to the portion insertable into the object and extending through the first end of the lifting member, a portion of the lifting member extending parallel to the line and being offset a second distance on a second side of the line, wherein the first distance is smaller than the second distance.

12. The device according to claim 11, wherein the contact member extends a width perpendicularly across the second end of the lifting member in a direction of the thickness of the lifting member, the width being greater than the thickness at about an area of connection between the contact member and the lifting member.

13. The device according to claim 11, wherein the first end of the lifting member is disposed vertically above the contact member when the lifting member is inserted into a hollow core of the object to be lifted and transported and the contact member is in contact with the hollow core.

14. The device according to claim 11, wherein the lifting member is hook-shaped.

15. The device according to claim 11, further comprising:
an individual support member disposed at an end of the handle member, wherein a longitudinal axis of the individual support member is perpendicular to a longitudinal axis of the handle member and a length along the longitudinal axis of the individual support member is at least a diameter of the handle member.

16. The device according to claim 11, wherein the handle member is a rectangular prism.

17. The device according to claim 16, further comprising:
an individual support member disposed at an end of the handle member, wherein a longitudinal axis of the individual support member is perpendicular to a longitudinal axis of the handle member and a length along the longitudinal axis of the individual support member is at least a width of the handle member.

18. The device according to claim 11, further comprising:
an adjustment member disposed on one of the linking member connector and the handle member for receiving a portion of the linking member between the first and second ends to modify a distance between the handle member and the linking member.

19. A device for manually lifting and transporting a rolled object, comprising:
- a handle, the handle including a connector disposed at about a center point of a length of the handle;
- a chain having first and second ends, wherein the first end is securely connected to the connector; and
- a hook-shaped lifting member, a first end of the hook-shaped lifting member securely connected to the second end of the chain; and
- a contact member disposed at a second end of the hook-shaped lifting member,
- wherein a plane extending parallel to a contact surface of the contact member is perpendicular to a line extending through the first end of the hook-shaped lifting member that is perpendicular to a portion of the hook-shaped lifting member, and a portion of the hook-shaped lifting member extending parallel to the line is offset on a first side of the line, and the contact member is offset on a second side of the line.

20. The device according to claim 19, wherein the contact member extends a width perpendicularly across the second end of the hook-shaped lifting member in a direction of the thickness of the hook-shaped lifting member, the width being greater than the thickness at about an area of connection between the contact member and the hook-shaped lifting member.

\* \* \* \* \*